US007634808B1

(12) United States Patent
Szor et al.

(10) Patent No.: US 7,634,808 B1
(45) Date of Patent: Dec. 15, 2009

(54) METHOD AND APPARATUS TO BLOCK FAST-SPREADING COMPUTER WORMS THAT USE DNS MX RECORD QUERIES

(75) Inventors: Peter Szor, Northridge, CA (US); Frederic Perriot, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 979 days.

(21) Appl. No.: 10/923,589

(22) Filed: Aug. 20, 2004

(51) Int. Cl.
*G08B 23/00* (2006.01)
(52) U.S. Cl. .......................... 726/22; 726/24; 709/223
(58) Field of Classification Search ................ 709/206; 713/160; 726/22, 24
See application file for complete search history.

(56) References Cited

U.S. PATENT DOCUMENTS

| | | | | |
|---|---|---|---|---|
| 6,434,600 | B2* | 8/2002 | Waite et al. ................ | 709/206 |
| 6,886,099 | B1* | 4/2005 | Smithson et al. ............. | 726/24 |
| 6,920,501 | B2* | 7/2005 | Chu et al. ................... | 709/228 |
| 6,941,348 | B2* | 9/2005 | Petry et al. ................. | 709/206 |
| 6,986,037 | B1* | 1/2006 | Assmann .................... | 713/155 |
| 7,130,401 | B2* | 10/2006 | Rampey et al. ........ | 379/142.14 |
| 7,334,262 | B2* | 2/2008 | Szor ............................ | 726/22 |
| 7,380,277 | B2* | 5/2008 | Szor ............................ | 726/24 |
| 2002/0073233 | A1* | 6/2002 | Gross et al. ................. | 709/245 |
| 2002/0174185 | A1* | 11/2002 | Rawat et al. ................ | 709/206 |
| 2003/0172264 | A1* | 9/2003 | Dillon ......................... | 713/160 |
| 2003/0177395 | A1* | 9/2003 | Pardee et al. ............... | 713/201 |
| 2003/0177396 | A1* | 9/2003 | Bartlett et al. .............. | 713/201 |
| 2004/0015726 | A1* | 1/2004 | Szor ............................ | 713/201 |
| 2004/0236999 | A1* | 11/2004 | Bezuidenhout .............. | 714/38 |
| 2005/0166268 | A1* | 7/2005 | Szor ............................ | 726/24 |
| 2006/0036690 | A1* | 2/2006 | O'Neil ....................... | 709/206 |

* cited by examiner

*Primary Examiner*—Ponnoreay Pich
(74) *Attorney, Agent, or Firm*—Gunnison, McKay & Hodgson, L.L.P.; Serge J. Hodgson

(57) ABSTRACT

Parameters of DNS transactions associated with DNS MX record queries, which may be performed by mass-mailing worms from a host computer system, are detected at a DNS proxy and collected. An outbound SMTP transaction, such as an e-mail message, received at an SMTP proxy is stalled at the SMTP proxy and a determination is made whether malicious code activity is detected on the host computer system by correlating the parameters associated with the DNS MX record queries and the e-mail message. In one embodiment, above a specified threshold rate of DNS MX record queries to resolve SMTP server IP addresses, followed by the use of a resolved SMTP server IP address to send the e-mail message, an assumption is made that the e-mail message is generated by a worm, such as a mass-mailing worm, and protective action is taken thus preventing propagation of the worm, or other malicious code, via the outbound e-mail message.

13 Claims, 7 Drawing Sheets

| TIME | ORIGIN IP ADDRESS | DOMAIN NAME | MX RECORD(S) | | SMTP SERVER IP ADDRESS |
| --- | --- | --- | --- | --- | --- |
| | | | SMTP SERVER NAME | SMTP SERVER PRIORITY | |
| 5.201889 | 192.168.0.1 | esrf.fr | mail1.esrf.fr | 1 | 192.172.0.1 |
| | | | mail2.esrf.fr | 2 | |
| ... | ... | ... | ... | ... | ... |

FIG. 4C

METHOD AND APPARATUS TO BLOCK FAST-SPREADING COMPUTER WORMS THAT USE DNS MX RECORD QUERIES

BACKGROUND OF THE INVENTION

1. Field of the Invention

The present invention relates to the protection of computer systems. More particularly, the present invention relates to a method and apparatus for blocking propagation of malicious code.

2. Description of Related Art

Malicious code that propagates from one computer to another over a network, e.g., via an e-mail message, is often referred to as a "worm". Most worms that spread from one computer to another are spread via e-mail messages over the Internet, and often as attachments to an e-mail message.

The most common way to send an e-mail message over the Internet is using the SMTP (Simple Mail Transfer Protocol). Some worms that utilize the SMTP are termed metamorphic, or polymorphic, worms as the worm changes its appearance every time it replicates. By changing its appearance, the metamorphic worm often avoids detection by anti-virus programs.

SUMMARY OF THE INVENTION

In accordance with one embodiment, a method includes stalling a SMTP transaction, such as an e-mail message, on a host computer system and determining whether DNS MX record queries occurring on the host computer exceed a specified DNS MX record query threshold. Upon a determination that the DNS MX record query threshold is exceeded, a determination is made whether the SMTP transaction includes a SMTP server IP address earlier resolved through a DNS MX record query on the host computer system. Upon a determination that the SMTP transaction includes a SMTP server IP address earlier resolved through a DNS MX record query on the host computer system, malicious code activity is indicated on the host computer system and protective action is taken. Otherwise, upon a determination that the SMTP transaction does not include a resolved SMTP server IP address, the SMTP transaction is released.

Embodiments in accordance with the present invention are best understood by reference to the following detailed description when read in conjunction with the accompanying drawings.

BRIEF DESCRIPTION OF THE DRAWINGS

FIG. 4C illustrates the DNS database of FIG. 4B further including selected parameters associated with the IP address returned in response to the DNS lookup in accordance with one embodiment of the invention.

Common reference numerals are used throughout the drawings and detailed description to indicate like elements.

DETAILED DESCRIPTION

Some fast spreading SMTP-based computer worms, such as Nimda, Klez, Bugbear, Sobig, and Mydoom worms, utilize a propagation method that is more efficient compared to other otherwise similar mass mailers. Generally, these worms use DNS (Domain Name Service) MX (Mail exchanger) record queries to identify potentially active SMTP servers.

Instead of using a single, or set of hard-coded SMTP server IP addresses, generally these worms attempt to locate and utilize as many SMTP servers as possible. For example, some of these worms search for an e-mail message on a host computer system and extract a domain name.

The worm then initiates a DNS MX record query utilizing a DNS client protocol to a DNS server to obtain the MX records associated with the domain name. Typically the response to the DNS MX record query returns a name or names of SMTP servers servicing the domain name and the priorities of the SMTP servers indicating whether a SMTP server is a primary or backup server.

When the worm receives a returned SMTP server name, the worm initiates a DNS lookup to the DNS server to obtain the IP address associated with the name of the SMTP server. The response to the DNS lookup, if successfully resolved, returns the IP addresses of the SMTP server. The worm then generates an e-mail message, typically with an attachment including malicious code, to propagate itself or other malicious code. The e-mail message is then sent to the SMTP server (typically using a SMTP client application on the host computer system). Thus, each time the worm locates an e-mail message on a host computer system, the worm can extract a domain name, locate IP addresses of associated SMTP servers, and generate an e-mail message to propagate malicious code to others.

Additionally, the worms often target backup servers instead of primary servers to enhance propagation, as backup SMTP servers typically are not as heavily loaded as primary SMTP servers. Thus, the priority designations returned in the response to the DNS MX record query can be utilized by the worm in selecting backup servers rather than primary servers.

In accordance with the present invention, parameters associated with DNS MX record queries on a host computer system, which may be performed by mass-mailing worms, are collected and correlated with parameters of a SMTP transaction, such as an e-mail message, outbound from the host computer system.

Above a specified threshold of DNS MX record queries to resolve SMTP server IP addresses, followed by the use of a resolved SMTP server IP address to send an e-mail message, it is assumed that the e-mail message is generated by malicious code, such as a mass-mailing worm, and protective action is taken, such as redirecting or blocking the e-mail message. In this way, mass-mailing worms that resolve SMTP server IP addresses through DNS MX record queries are blocked from propagating from the host computer system.

Figure 2:
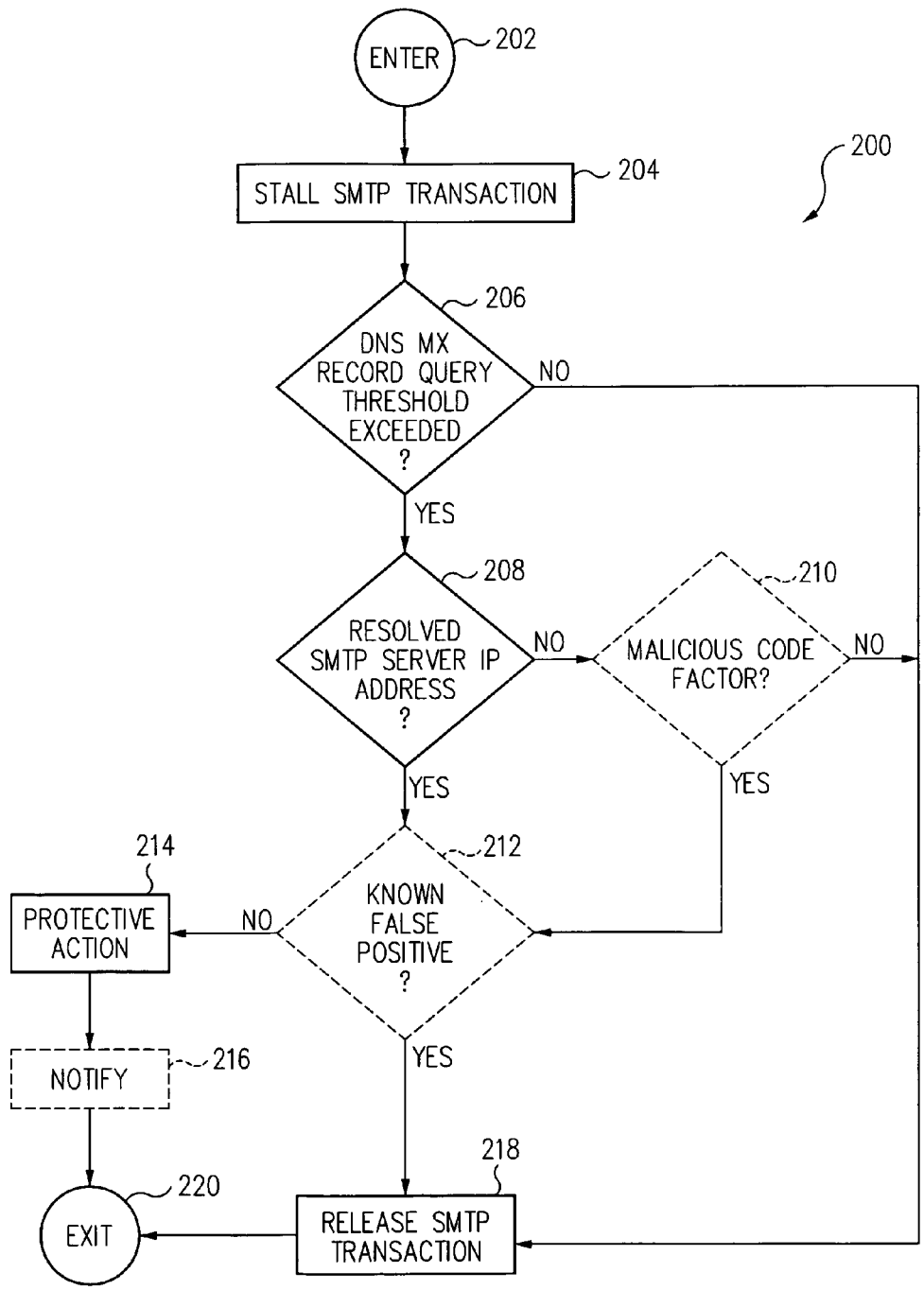
FIG. 2 illustrates a flow diagram of a process implemented by the worm blocking application of FIG. 1 in accordance with one embodiment of the invention.

More particularly, in accordance with one embodiment of the invention, referring to FIG. 2, a method for blocking propagation of malicious code, such as a mass-mailing worm, includes stalling an outgoing SMTP transaction, such as an e-mail message, at a host computer system (operation 204). Based upon parameters of DNS transactions associated with DNS MX record queries on the host computer system, a determination is made whether a DNS MX record query threshold is exceeded (operation 206).

If the DNS MX record query threshold is not exceeded, the SMTP transaction, i.e., the e-mail message, is released (operation 218). Otherwise, if the DNS MX record query threshold is exceeded, a determination is made whether the SMTP transaction is being sent to a SMTP IP address earlier resolved through the use of a DNS MX record query on the host computer system (operation 208).

If the SMTP transaction is not being sent to a SMTP server IP address earlier resolved through the use of a DNS MX record query, the SMTP transaction is released (operation 218). Otherwise, if the SMTP transaction is being sent to a SMTP server IP address earlier resolved through the use of a DNS MX record query, protective action is taken, such as blocking the e-mail message from being sent (operation 214). Optionally, a notification of the detection of malicious code and/or the protective action taken is provided to a user and/or other entity, such as a system administrator (operation 216).

In some embodiments, prior to taking protective action, optionally, the SMTP transaction is checked to determine if it is a known false positive (operation 212). If the SMTP transaction is a known false positive, it is released (operation 218), otherwise, protective action is taken (operation 214).

In some embodiments, prior to releasing a SMTP transaction where the DNS MX record query threshold is exceeded, but an earlier resolved SMTP server IP address is not utilized, the SMTP transaction is checked for the presence of one or more malicious code factors which indicate malicious code activity (operation 210). If the SMTP transaction includes one or more malicious code factors, protective action is taken (operation 214), otherwise the SMTP transaction is released (operation 218). The optional known false positive check (operation 212) may also be performed.

Figure 1:
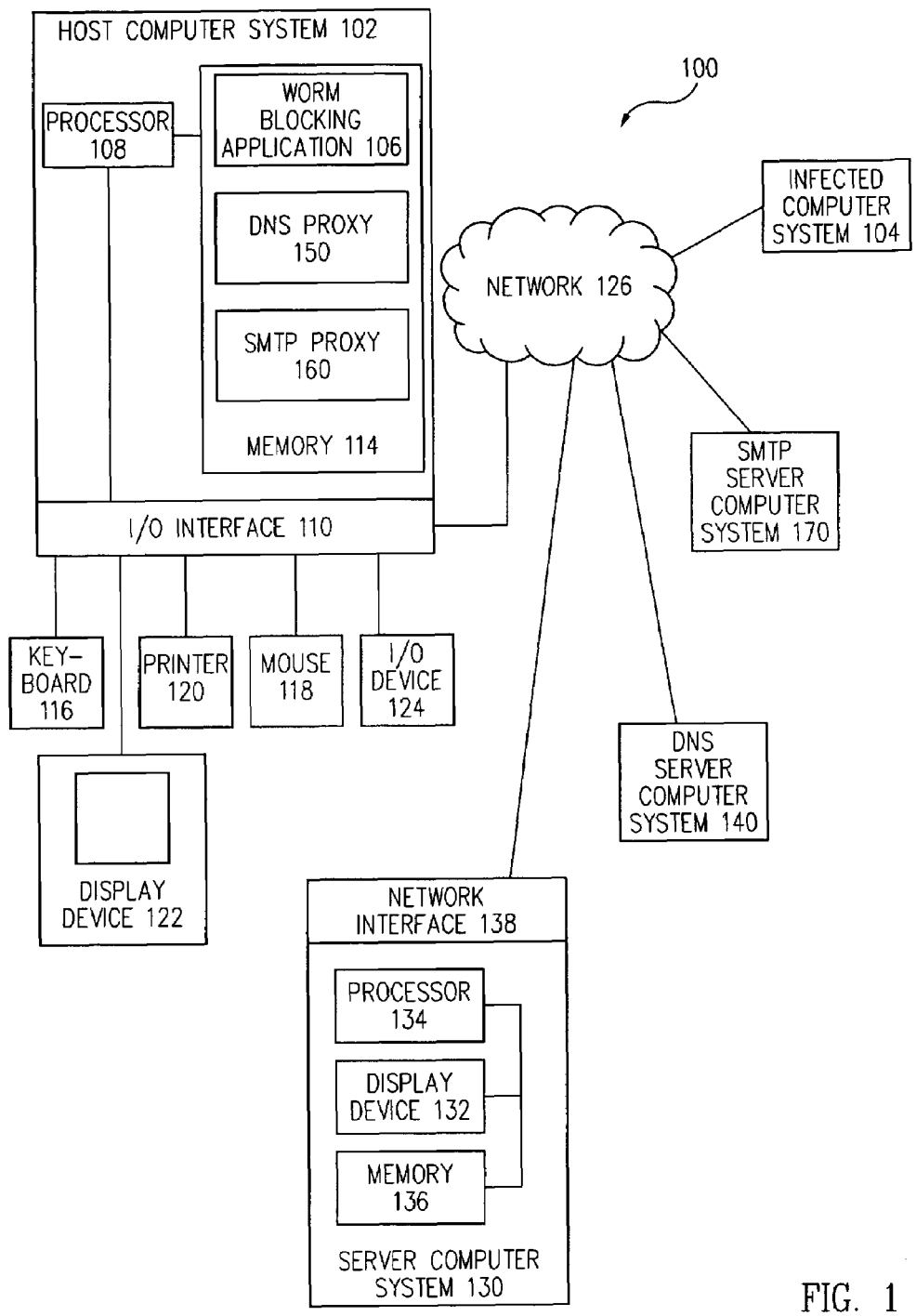
FIG. 1 is a diagram of a client-server system that includes a worm blocking application executing on a host computer system in accordance with one embodiment of the present invention.

FIG. 1 is a diagram of a client-server system 100 that includes a worm blocking application 106 executing on a host computer system 102 in accordance with one embodiment of the present invention. Host computer system 102, sometimes called a client or user device, typically includes a central processing unit (CPU) 108, hereinafter processor 108, an input/output (I/O) interface 110, and a memory 114. Host computer system 102 may further include standard devices like a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, worm blocking application 106 is loaded into host computer system 102 via I/O device 124, such as from a CD, DVD or floppy disk containing worm blocking application 106.

Host computer system 102 is coupled to a server computer system 130 by a network 126. Server computer system 130 typically includes a display device 132, a processor 134, a memory 136, and a network interface 138. Host computer system 102 is further coupled to a DNS server computer system 140 and a SMTP server computer system 170 by network 126.

Host computer system 102 further includes a DNS proxy 150, which emulates, e.g., mimics, a DNS server, e.g., DNS server computer system 140. In the present embodiment, DNS proxy 150 is part of worm blocking application 106, however in other embodiments, DNS proxy 150 is separate from worm blocking application 106 and is accessible by worm blocking application 106. In some embodiments, DNS proxy 150 is part of another application, such as an anti-viral application.

DNS proxy 150 sits between DNS client applications of host computer system 102 and a DNS server, e.g., DNS server computer system 140. Accordingly, instead of a DNS client application of host computer system 102 directly establishing a connection with the DNS server, e.g., DNS server computer system 140, the DNS client application establishes a connection to DNS proxy 150.

Further, instead of a DNS client application of host computer system 102 directly sending transactions, e.g., a DNS MX record query, to the DNS server, transactions from the DNS client application are sent to DNS proxy 150, which sends the transactions to the DNS server as needed. DNS proxies are well known to those of skill in the art and so are only briefly discussed to avoid detracting from the principles of the invention.

Host computer system 102 further includes a SMTP proxy 160, which emulates, e.g., mimics, a SMTP server, e.g., SMTP server computer system 170. In the present embodiment, SMTP proxy 160 is part of worm blocking application 106, however in other embodiments, SMTP proxy 160 is separate from worm blocking application 106 and is accessible by worm blocking application 106. In some embodiments, SMTP proxy 160 is part of another application, such as an anti-viral application.

SMTP proxy 160 sits between SMTP client applications of host computer system 102 and a SMTP server, e.g., SMTP server computer system 170. Accordingly, instead of a SMTP client application of host computer system 102 directly establishing a connection with the SMTP server, e.g., SMTP server computer system 170, the SMTP client application establishes a connection to SMTP proxy 160.

Further, instead of a SMTP client application of host computer system 102 directly sending a SMTP transaction, e.g., an e-mail message, to a SMTP server, the transaction from the SMTP client application is sent to SMTP proxy 160 which sends the transaction to the SMTP server. SMTP proxies are well known to those of skill in the art and so are only briefly discussed to avoid detracting from the principles of the invention.

Host computer system 102 is also coupled to an infected computer system 104 by network 126. In one embodiment, infected computer system 104 is similar to host computer system 102, for example, includes a central processing unit, an input/output (I/O) interface and a memory. Infected computer system 104 may further includes standard devices like a keyboard, a mouse, a printer, a display device, and an I/O device(s). The various hardware components of infected computer system 104 are not illustrated to avoid detracting from the principles of the invention.

Network 126 can be any network or network system that is of interest to a user. In various embodiments, network interfaces 138 and I/O interface 110 include analog modems, digital modems, or a network interface card.

In the present embodiment, worm blocking application 106 is stored in memory 114 of host computer system 102 and executed on host computer system 102. The particular type and configuration of host computer system 102, server computer system 130, DNS server computer system 140, and SMTP server computer system 170 are not essential to this embodiment of the present invention.

FIG. 2 illustrates a flow diagram of a process 200 implemented by worm blocking application 106 in accordance with one embodiment of the invention. Referring now to FIG. 2, execution of worm blocking application 106 by processor 108 results in the operations of process 200, in which, in one embodiment, SMTP proxy 160 intercepts a SMTP transaction, i.e., an e-mail message bound for a SMTP server, such as SMTP server computer system 170, and process 200 is entered at ENTER operation 202. From ENTER operation 202, processing transitions to a STALL SMTP TRANSACTION operation 204.

In STALL SMTP TRANSACTION operation 204, the SMTP transaction, e.g., the e-mail message, is stalled and prevented from release from host computer system 102. For example, in one embodiment, worm blocking application 106 directs SMTP proxy 160 to stall the SMTP transaction, such as by redirecting the SMTP transaction to a memory buffer of SMTP proxy 160. From STALL SMTP TRANSACTION operation 204, processing transitions to a DNS MX RECORD QUERY THRESHOLD EXCEEDED check operation 206.

In DNS MX RECORD QUERY THRESHOLD EXCEEDED check operation 206, worm blocking application 106 determines whether the rate of DNS MX record queries occurring on host computer system 102 exceeds a specified DNS MX record query threshold. Exceeding the DNS MX record query threshold indicates that DNS MX record queries are occurring above a level that would be expected on host computer system 102, and that a SMTP transaction should be evaluated to determine whether it indicates malicious code activity is occurring on host computer system 102, such as worm mass-mailing activity. In one embodiment, the rate of DNS MX record queries occurring on host computer system 102 is termed the DNS database rate. In one embodiment, the DNS database rate is determined by worm blocking application 106 based upon parameters maintained in a DNS database generated by worm blocking application 106, further described herein with reference to FIGS. 3 and 4A-4C.

Although the DNS MX record query threshold can be defined in a wide variety of ways, in one embodiment the DNS MX record query threshold is defined as a specified rate of a total number of DNS MX record queries per unit of time, for example, a rate of one (1) DNS MX record query per ten (10) seconds. In one embodiment, the DNS MX record queries include DNS MX record queries that are resolved, i.e., result in a SMTP server IP address, and unresolved, i.e., do not result in a SMTP server IP address. In other embodiments, the DNS MX record queries can be differently defined, for example, the DNS MX record queries can include only DNS MX record queries that are resolved.

In one embodiment, worm blocking application 106 calculates the DNS database rate and compares the DNS database rate against the DNS MX record query threshold. In one embodiment, worm blocking application 106 calculates the DNS database rate from the total number of DNS MX record queries (resolved and unresolved) per unit of time for example, the total number of DNS MX record queries per second over a given time period, such as the last hour. In one embodiment, worm blocking application 106 utilizes time parameters associated with the DNS MX record queries in establishing the DNS database rate.

In one embodiment, if the DNS database rate is equal to or less than the DNS MX record query threshold, the DNS MX record query threshold is not exceeded. Otherwise, if the DNS database rate is greater than the DNS MX record query threshold, the DNS MX query threshold is exceeded.

Upon a determination that the DNS MX record query threshold is not exceeded ("NO"), the SMTP transaction is assumed to not be indicative of malicious code activity, and processing transitions from DNS MX RECORD QUERY THRESHOLD EXCEEDED check operation 206 to a RELEASE SMTP TRANSACTION operation 218.

In RELEASE SMTP TRANSACTION operation 218, the SMTP transaction is released for sending to the intended SMTP server, e.g., SMTP server computer system 170, for example, by worm blocking application 106 directing SMTP proxy 160 to release the SMTP transaction. From RELEASE SMTP TRANSACTION operation 218, processing transitions to an EXIT operation 220 with processing exiting process 200.

In some embodiments, rather than processing transitioning from RELEASE SMTP TRANSACTION operation 218 to EXIT operation 220, processing transitions from RELEASE SMTP TRANSACTION operation 218 and returns to ENTER operation 202 and awaits the next SMTP transaction.

Referring again to DNS MX RECORD QUERY THRESHOLD EXCEEDED check operation 206, alternatively, upon a determination that the DNS MX record query threshold is exceeded ("YES"), the SMTP transaction is assumed to be tentatively indicative of malicious code activity, and processing transitions to a RESOLVED SMTP SERVER IP ADDRESS check operation 208.

In RESOLVED SMTP SERVER IP ADDRESS check operation 208, worm blocking application 106 determines whether the SMTP transaction is being sent to a SMTP server IP address that was earlier resolved using a DNS MX record query. In one embodiment, worm blocking application 106 examines the DNS database to determine if the SMTP server IP address of the SMTP transaction was earlier resolved utilizing a DNS MX record query, i.e., a DNS MX record query that resulted in a SMTP server name that was resolved through a DNS lookup to obtain the server IP address.

Upon a determination that the SMTP transaction is being sent to a SMTP server IP address earlier resolved utilizing a DNS MX record query ("YES"), the SMTP transaction is assumed to be indicative of malicious code activity, and processing optionally transitions to a KNOWN FALSE POSITIVE check operation 212, or directly to a PROTECTIVE ACTION operation 214, if optional KNOWN FALSE POSITIVE check operation 212 is not performed.

In optional KNOWN FALSE POSITIVE check operation 212, worm blocking application 106 determines whether the SMTP transaction is a known false positive. In one embodiment, the IP address of the SMTP server is compared to a listing of SMTP server IP addresses that are defined to be not indicative of malicious code activity, i.e., known false positives. In one embodiment, the false positive list is part of worm blocking application 106, however in other embodiments, the false positive list is located separate from worm blocking application 106, but is accessible by worm blocking application 106.

In one embodiment, worm blocking application 106 compares the IP address of the SMTP server utilized by the SMTP transaction against known false positive IP address entries in the false positive list. If the SMTP server IP address matches an entry ("YES") in the false positive list, the SMTP transaction is determined to be a false positive, i.e., not indicative of malicious code activity, and processing transitions from KNOWN FALSE POSITIVE check operation 212 to RELEASE SMTP TRANSACTION operation 218, earlier described. Alternatively, if the SMTP server IP address does not match an entry in the false positive list ("NO"), the SMTP transaction is determined not to be a false positive, i.e., remains indicative of malicious code activity, and processing transitions from KNOWN FALSE POSITIVE check operation 212 to a PROTECTIVE ACTION operation 214.

In PROTECTIVE ACTION operation 214, worm blocking application 106 initiates protective action(s) on host computer system 102. In one embodiment, worm blocking application 106 directs SMTP proxy 160 to block the sending of the stalled SMTP transaction, for example, by deleting or overwriting the SMTP transaction. In another embodiment, worm blocking application directs SMTP proxy 160 to redirect the SMTP transaction, for example, to a quarantine buffer or to a virus collection system, for further evaluation. In some embodiments, worm blocking application 106 can additionally direct DNS proxy 150 to terminate all DNS activity, allowing a user or a system administrator to locate and remove the malicious code initiating the DNS MX record queries. From PROTECTIVE ACTION operation 214, processing optionally transitions to a NOTIFY operation 216, or directly to EXIT operation 220, if NOTIFY operation 216 is not performed.

In optional NOTIFY operation 216, worm blocking application 106 generates a notification to a user and/or other entity, such as a system administrator. In one embodiment, the notification indicates the detection of malicious code activity and/or the protective action taken. From NOTIFY operation 216, processing transitions to EXIT operation 220 with processing exiting process 200.

Referring again to RESOLVED SMTP SERVER IP ADDRESS check operation 208, alternatively, if the SMTP transaction is not being sent to a SMTP server IP address earlier resolved utilizing a DNS MX record query ("NO"), the SMTP transaction is not assumed to be indicative of malicious code activity and processing optionally transitions to a MALICIOUS CODE FACTOR check operation 210, or directly to RELEASE TRANSACTION operation 218, earlier described.

In optional MALICIOUS CODE FACTOR check operation 210, the SMTP transaction is evaluated for other specified indicators of malicious code activity, i.e., malicious code factors. Examples of malicious code factors include, but are not limited to, the presence of e-mail message attachments, the use of a backup SMTP server IP address, and the presence of malicious code strings. In one embodiment, the presence of a specified malicious code factor or factors, in the absence of a resolved SMTP server IP address, is assumed to be indicative of malicious code activity.

Upon a determination that specified malicious code factors are not present ("NO"), from MALICIOUS CODE FACTOR check operation 210, processing transitions to RELEASE SMTP TRANSACTION operation 218, earlier described. Otherwise, upon a determination that specified malicious code factors are present in the SMTP transaction ("YES"), processing optionally transitions to KNOWN FALSE POSITIVE check operation 212, or directly to PROTECTIVE ACTION operation 214, earlier described.

As earlier described with reference to FIG. 2 and process 200, in one embodiment, worm blocking application 106 calculates a DNS database rate utilizing parameters detected by DNS proxy 150 and recorded by worm blocking application 106 in a DNS database. Worm blocking application 106 utilizes the DNS database rate to determine whether the DNS MX record query threshold is exceeded, i.e., whether a suspiciously higher number of DNS MX record queries are being detected on host computer system 102 over what is expected. Further, worm blocking application 106 also utilizes the DNS database to determine whether a SMTP server IP address used by a SMTP transaction, such as an e-mail message, was earlier resolved through a DNS MX record query.

Figure 3:
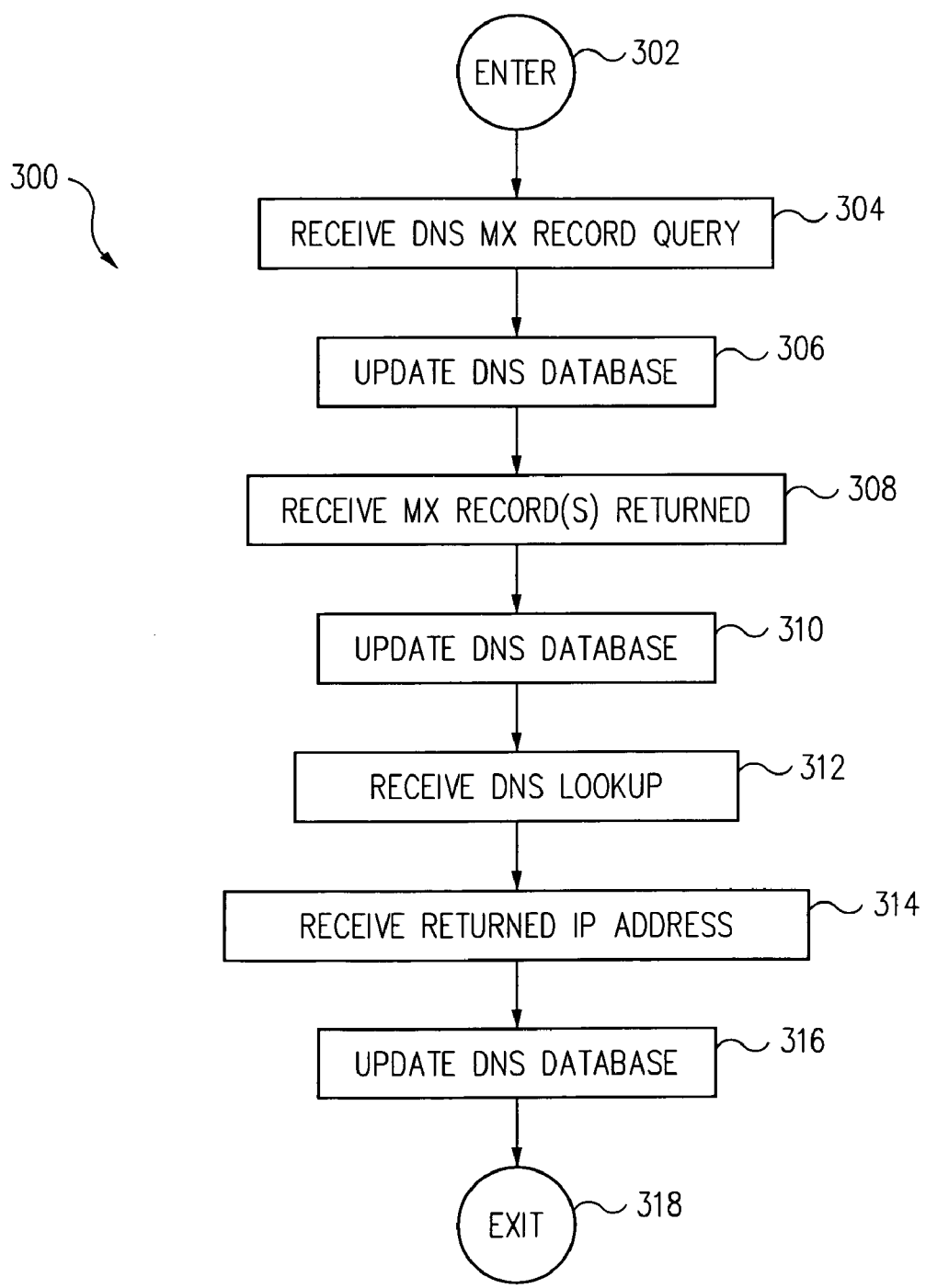
FIG. 3 illustrates a flow diagram of a process implemented by the worm blocking application of FIG. 1 for generating a DNS database in accordance with one embodiment of the present invention.

FIG. 3. illustrates a flow diagram of a process 300 implemented by worm blocking application 106 for generating a DNS database in accordance with one embodiment of the present invention. Referring now to FIG. 3, in one embodiment, DNS proxy 150 detects a specified DNS transaction, such as a DNS MX record query, passes parameters associated with the DNS transaction to worm blocking application 106, and process 300 is entered at ENTER operation 302.

For purposes of example, the DNS MX record query is assumed to be generated by malicious code, such as by a mass mailing worm received in an e-mail message attachment from infected computer system 104. In this example, it is further assumed the worm has located a domain name from an e-mail message on host computer system 102, such as "esrf.fr", and generated the DNS MX record query to obtain the names of SMTP servers associated with the domain name. From ENTER operation 302, processing transitions to a RECEIVE DNS MX RECORD QUERY operation 304.

In RECEIVE DNS MX RECORD QUERY operation 304, worm blocking application 106 receives parameters associated with the DNS MX record query from DNS proxy 150, such as the time of the DNS MX record query, the IP address of the requester, and the domain name being queried for MX records. From RECEIVE DNS MX RECORD QUERY operation 304, processing transitions to an UPDATE DNS DATABASE operation 306.

Figure 4A:
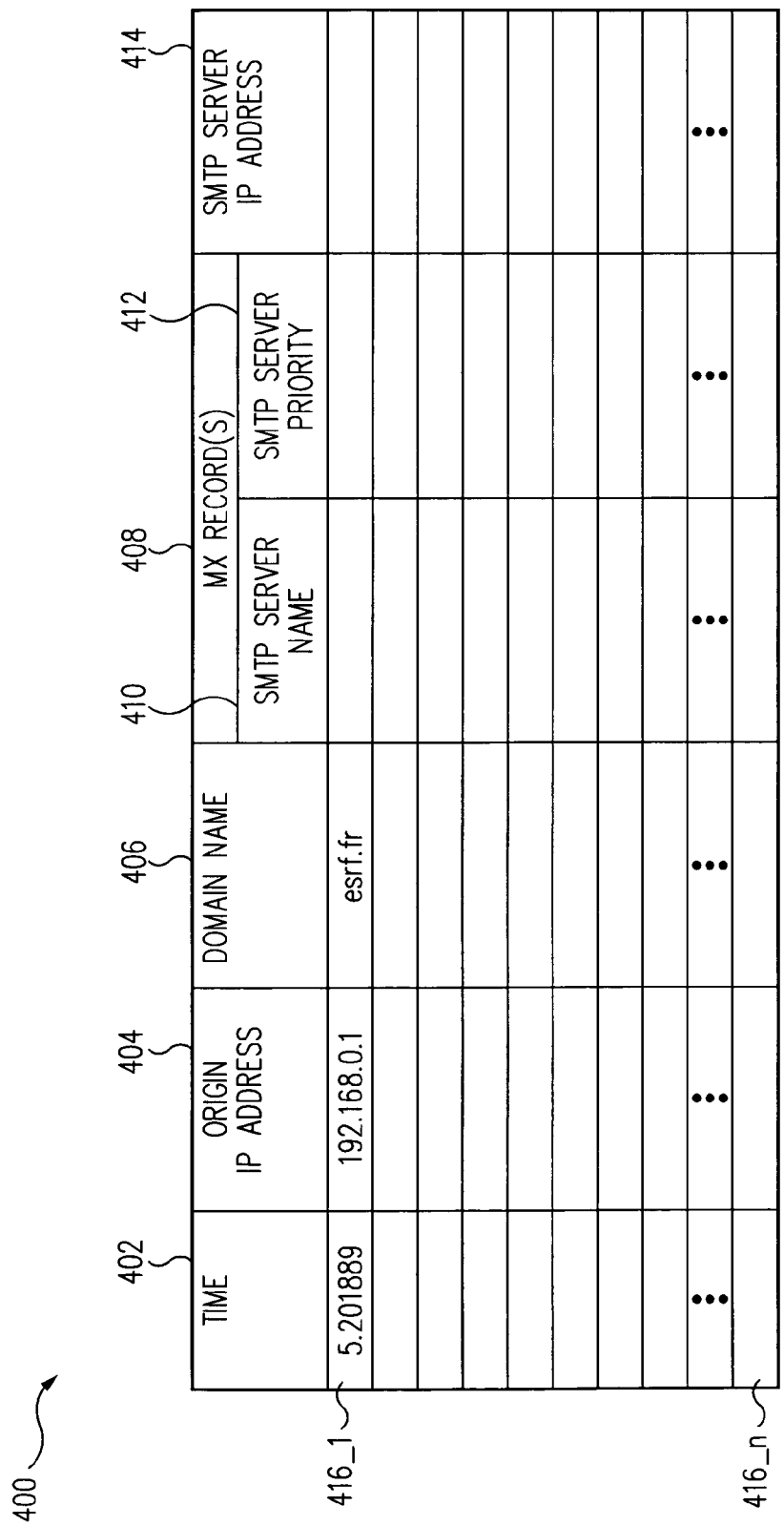
FIG. 4A illustrates an example of a DNS database generated by the worm blocking application of FIG. 1 including selected parameters associated with a DNS MX record query in accordance with one embodiment of the invention.

In UPDATE DNS DATABASE operation 306, worm blocking application 106 updates a DNS database with the parameters associated with the DNS MX record query as further described herein with reference to FIG. 4A.

FIG. 4A illustrates an example of a DNS database 400 generated by worm blocking application 106 including selected parameters associated with a DNS MX record query in accordance with one embodiment of the invention. Referring now to FIG. 4A, in one embodiment, DNS database 400 includes: a time 402 field; an origin IP address 404 field; a domain name 406 field; an MX record(s) 408 field, including a SMTP server name 410 field and a SMTP server priority 412 field; and, a SMTP server IP address 414 field.

In the present embodiment, time 402 field includes the time a DNS MX record query is made on host computer system 102. Origin IP address 404 field includes the IP address of the computer system initiating the DNS MX record query, e.g., host computer system 102. Domain name 406 field includes the name being queried for MX records.

MX record(s) 408 field includes selected parameters received in response to the DNS MX record query. In the present embodiment, SMTP server name 410 field includes each SMTP server name returned in response to the DNS MX record query. SMTP server priority 412 field includes the priority associated with each returned SMTP server name, for example, primary (1) or backup (2). SMTP server IP address 414 field includes the IP address returned from a successfully resolved DNS lookup of the SMTP server name, i.e., a resultant resolved SMTP server IP address.

Parameters associated with DNS MX record queries are entered across rows 416_1-416_n. In one embodiment, the DNS MX record queries are time ordered in DNS database 400, for example, from oldest in time to most recent in time. In one embodiment, DNS database 400 is a circular memory structure, where when capacity is reached, the next entry is added and the oldest entry is dropped.

Referring now to FIGS. 3 and 4A together, in one embodiment, in operation 306, worm blocking application 106 updates DNS database 400 with parameters associated with the DNS MX record query and received in operation 304. In FIG. 4A, parameters associated with the DNS MX record query are shown in row 416_1. Thus, in operation 306, in one embodiment, parameters associated with the DNS MX record query include the time of the DNS MX record query (5.201889) the originating IP address, e.g., host computer system 102 (192.168.0.1), and the domain name being queried for the MX records (esrf.fr). From UPDATE DNS DATABASE operation 306, processing transitions to a RECEIVE MX RECORD(S) RETURNED operation 308.

In RECEIVE MX RECORD(S) RETURNED operation 308, worm blocking application 106 receives parameters detected by DNS proxy 150 associated with the MX records returned in response to the DNS MX record query, such as the servicing SMTP server(s) and the priority of each SMTP server. From RECEIVE MX RECORD(S) RETURNED operation 308, processing transitions to an UPDATE DNS DATABASE operation 310.

Figure 4B:
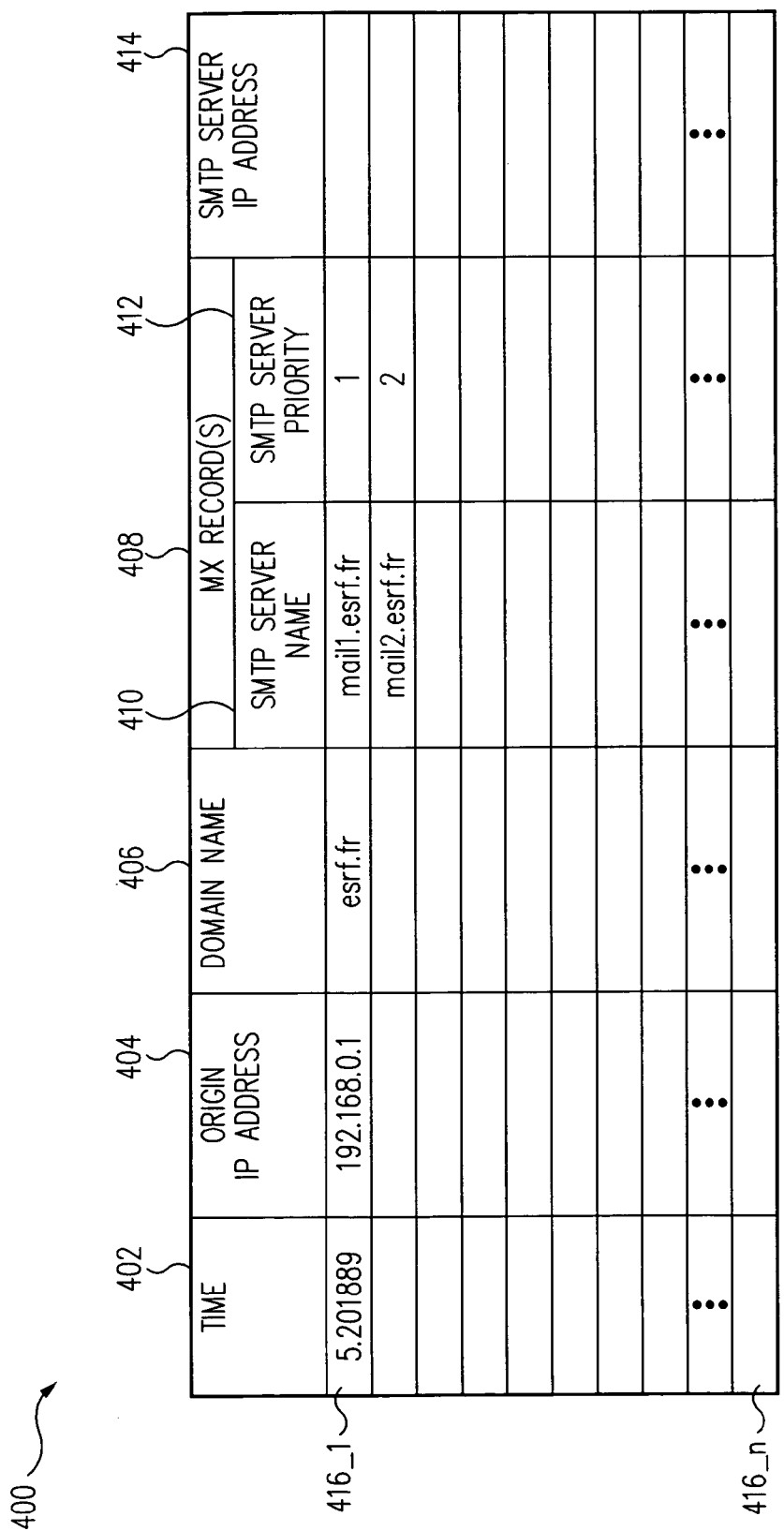
FIG. 4B illustrates the DNS database of FIG. 4A further including selected parameters associated with MX records returned in response to the DNS MX record query in accordance with one embodiment of the invention.

In UPDATE DNS DATABASE operation 310, worm blocking application 106 updates DNS database 400 with selected parameters associated with the MX records returned in response to the DNS MX record query in operation 308 as further described herein with reference to FIG. 4B.

FIG. 4B illustrates DNS database 400 of FIG. 4A further including selected parameters associated with the MX records returned in response to the DNS MX record query in accordance with one embodiment of the invention. Referring now to FIGS. 3 and 4B together, in one embodiment, in operation 310, worm blocking application 106 updates DNS database 400 with parameters associated with the MX records received in response to the DNS MX record query of operation 304. In FIG. 4B, parameters associated with the MX records include the SMTP server names (mail1.esrf.fr and mail2.esrf.fr) and the priorities of each SMTP server name (respectively, 1 (primary) and 2 (backup)). From UPDATE DNS DATABASE operation 310, processing transitions to a RECEIVE DNS LOOKUP operation 312.

In RECEIVE DNS LOOKUP operation 312, worm blocking application 106 receives parameters from DNS proxy 150 associated with a DNS lookup to obtain an IP address for a SMTP name returned in response to the DNS MX record query. For example, now that the worm has received a name of a SMTP server servicing the domain name found in the e-mail message, the worm generates a DNS lookup to obtain the IP address for the returned SMTP server name "mail1.esrf.fr". Worm blocking application 106 receives the parameters associated with the DNS lookup and stores the parameters to correlate, e.g. link, a subsequent returned name resolution (if any) to the source DNS MX record query. The DNS lookup parameters can be maintained in a separate memory structure of worm blocking application 106, or entered in database 400. In the present embodiment, the DNS lookup parameters are maintained in a separate memory structure. Processing transitions from RECEIVE DNS LOOKUP operation 312 to a RECEIVE RETURNED IP ADDRESS operation 314.

In RECEIVE RETURNED IP ADDRESS operation 314, worm blocking application 106 receives parameters from DNS proxy 150 associated with the returned name resolution, i.e., the IP address of the SMTP server. From RECEIVE RETURNED IP ADDRESS operation 314, processing transitions to an UPDATE DNS DATABASE operation 316.

In UPDATE DNS DATABASE operation 316, worm blocking application updates DNS database 400 with selected parameters associated with the name resolution returned in response to the DNS lookup, i.e., the IP address of the SMTP server, further described herein with reference to FIG. 4C.

FIG. 4C illustrates DNS database 400 of FIG. 4B further including selected parameters associated with the IP address returned in response to the DNS lookup in accordance with one embodiment of the invention. Referring now to FIGS. 3 and 4C together, in one embodiment, in operation 316, worm blocking application 106 updates DNS database 400 with parameters associated with the name resolution returned in response to the DNS lookup.

In FIG. 4C, parameters associated with the name resolution include the SMTP server IP address (192.172.0.1). From UPDATE DNS DATABASE operation 316, processing transitions to an EXIT operation 318 with processing exiting process 300. In some embodiments, rather than processing transitioning from UPDATE DNS DATABASE operation 316 to EXIT operation 318, processing transitions from UPDATE DNS DATABASE operation 316, and returns to ENTER operation 302 and awaits the next DNS transaction.

In alternative embodiments, DNS database 400 can be differently generated so long as the parameters needed for the operations of process 200 are available. Further, in alternative embodiments, DNS transactions detected and passed by DNS proxy 150 to worm blocking application 106, need not be in order. In these alternative embodiments, worm blocking application 106 correlates the parameters passed from DNS proxy 150 and associates the parameters with source DNX MX record queries.

As earlier described in one embodiment, DNS proxy 150 and SMTP proxy 160 are part of worm blocking application 106 and are established by worm blocking application 106 on host computer system 102. DNS proxy 150 monitors DNS transactions on host computer system 102 and passes parameters of selected DNS transactions associated with DNS MX record queries to worm blocking application 106. SMTP proxy 160 monitors SMTP transactions on host computer system 102 and can stall, redirect, and release SMTP transactions as directed by worm blocking application 106.

Figure 5:
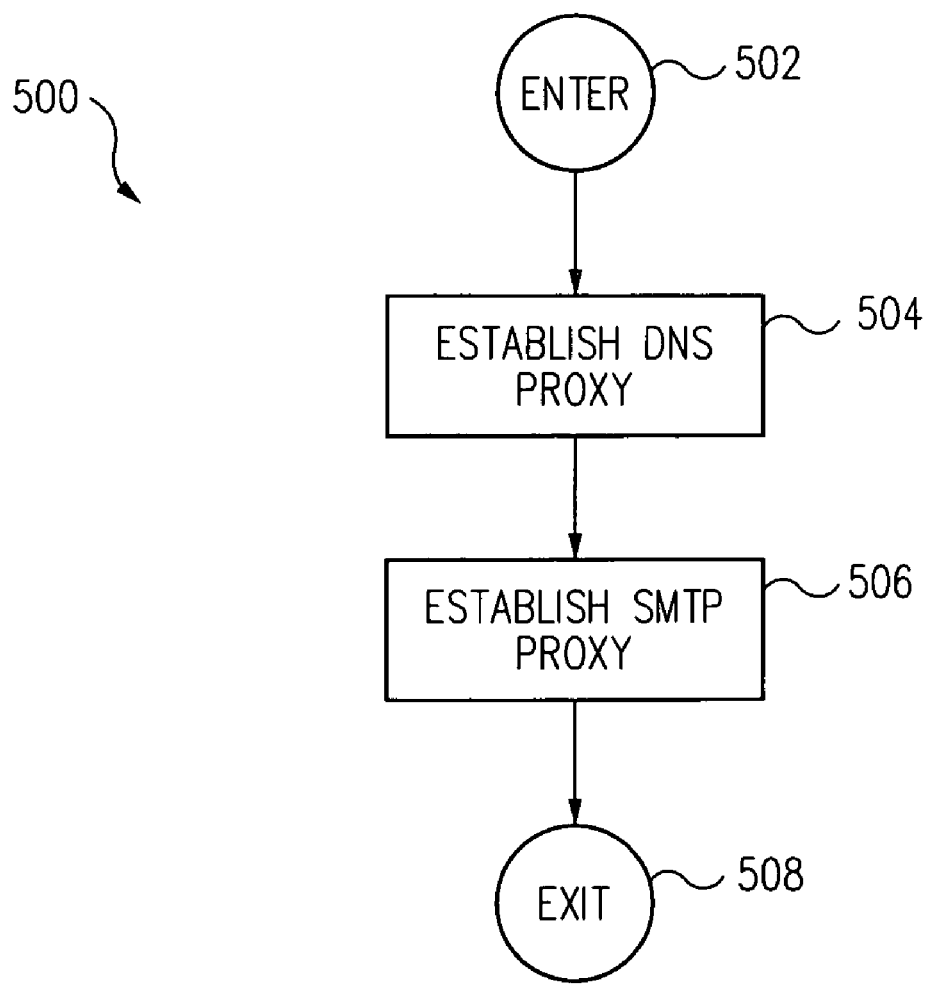
FIG. 5 illustrates a flow diagram of a process implemented by the worm blocking application of FIG. 1 for establishing a DNS proxy and a SMTP proxy on a host computer system in accordance with one embodiment of the present invention.

FIG. 5 illustrates a flow diagram of a process 500 for establishing DNS proxy 150 and SMTP proxy 160 on host computer system 102 in accordance with one embodiment of the invention. Referring to FIG. 5, in one embodiment, during installation of worm blocking application 106, from an ENTER operation 502, processing transitions to an ESTABLISH DNS PROXY operation 504.

In ESTABLISH DNS PROXY operation 504, DNS proxy 150 is established on host computer system 102. Establishment of DNS proxies on a host computer system is well known to those of skill in the art and is only briefly described to avoid detracting from the principles of the invention. Generally, a DNS proxy is established between a DNS client application on a host computer system and a DNS server, such as DNS server computer system 140, by hooking, intercepting, or otherwise detecting parameters associated with DNS transactions, such as DNS MX record queries and responses, and DNS lookups and responses, being sent and received on the host computer system.

In the present embodiment, establishment of DNS proxy 150 permits DNS transactions, such as DNS MX record queries and responses, and, DNS lookups and responses, to be detected on host computer system 102 and parameters associated with the DNS transactions to be passed to worm blocking application 106.

In the present embodiment, DNS proxy 150 is set to detect selected DNS transactions, such as DNS MX record queries and responses and DNS lookup queries and responses, and to pass parameters associated with these DNS transactions to worm blocking application 106. Worm blocking application 106 correlates the parameters associated with these DNS transactions and enters selected parameters in DNS database 400 as earlier described. In other embodiments, DNS proxy 150 can be differently set, for example to pass parameters about all DNS transactions, and worm blocking application 106 can be further configured to extract the parameters needed for DNS database 400. From ESTABLISH DNS PROXY operation 504, processing transitions to an ESTABLISH SMTP PROXY operation 506.

In ESTABLISH SMTP PROXY operation 506, SMTP proxy 160 is established on host computer system 102. Establishment of SMTP proxies on a host computer system is well known to those of skill in the art and is only briefly described to avoid detracting from the principles of the invention.

Establishment of SMTP proxy 160 permits SMTP transactions, and in particular e-mail messages, outbound from host computer system 102 to a SMTP server, such as SMTP server computer system 170, to be intercepted and stalled on host computer system 102. Further, the SMTP transaction is then released or protective actions taken with inputs to SMTP proxy 160 from worm blocking application 106, such as to block or redirect the stalled SMTP transaction.

From ESTABLISH SMTP PROXY operation 506, processing transitions to an EXIT operation 508, with processing exiting process 500.

Thus in accordance with the invention, a DNS proxy and a SMTP proxy are established on a host computer system. DNS transactions associated with DNS MX record queries, which may be performed by mass-mailing worms from a host computer system, are detected by DNS proxy 150. DNS proxy 150 passes parameters associated with the DNS transactions to worm blocking application 106 which associates the parameters with source DNS MX record queries in DNS database 400.

An outbound SMTP transaction, such as an e-mail message received at SMTP proxy 160 is stalled and a determination is made by worm blocking application 106 whether malicious code activity is detected on host computer system 102 by correlating the parameters associated with the DNS MX record queries and the e-mail message. In one embodiment, above a specified threshold rate of DNS MX record queries to resolve SMTP server IP addresses, followed by the use of a resolved SMTP server IP address to send the e-mail message, an assumption is made that the e-mail message is generated by a worm, such as a mass-mailing worm, and protective action is taken, such as blocking or redirecting the e-mail message, thus preventing propagation of the worm, or other malicious code, from host computer system 102.

Referring again to FIG. 1, worm blocking application 106 is in computer memory 114. As used herein, a computer memory refers to a volatile memory, a non-volatile memory, or a combination of the two.

Although worm blocking application 106 is referred to as an application, this is illustrative only. Worm blocking application 106 should be capable of being called from an application or the operating system.

In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, and servers on a network.

As illustrated in FIG. 1, this medium may belong to the computer system itself. However, the medium also may be removed from the computer system. For example, worm blocking application 106 may be stored in memory 136 that is physically located in a location different from processor 108. Processor 108 should be coupled to memory 136. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that includes components that can execute the worm blocking functionality in accordance with at least one of the embodiments as described herein. Similarly, in another embodiment, host computer system 102 and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the worm blocking functionality in accordance with one embodiment of present invention can be implemented in a wide variety of computer system configurations. In addition, the worm blocking functionality could be stored as different modules in memories of different devices.

For example, worm blocking application 106 could initially be stored in server computer system 130, and then as necessary, a portion of worm blocking application 106 could be transferred to host computer system 102 and executed on host computer system 102. Consequently, part of the worm blocking functionality would be executed on processor 134 of server computer system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, worm blocking application 106 is stored in memory 136 of server computer system 130. Worm blocking application 106 is transferred over network 126 to memory 114 in host computer system 102. In this embodiment, network interface 138 and I/O interface 110 would include analog modems, digital modems, or a network interface card. If modems are used, network 126 includes a communications network, and worm blocking application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
   stalling a SMTP transaction from a client application on a host computer system;
   determining whether a DNS MX record query threshold of DNS MX record queries from client applications of said host computer system is exceeded;
   wherein upon a determination that said DNS MX record query threshold is exceeded, determining whether said SMTP transaction includes a resolved SMTP server IP address returned to said host computer system from a DNS lookup of an IP address of a SMTP server name returned to said host computer system in response to said DNS MX record queries; and
   wherein upon a determination that said SMTP transaction includes said resolved SMTP server IP address, taking protective action.

2. The method of claim 1, further comprising:
   providing a notification.

3. The method of claim 1, further comprising:
   wherein upon a determination that said DNS MX record query threshold is not exceeded, releasing said SMTP transaction.

4. The method of claim 1, further comprising:
   prior to said taking protective action, determining whether said SMTP transaction is a known false positive; and
   wherein upon a determination that said SMTP transaction is said known false positive, releasing said SMTP transaction, wherein said taking protective action is not performed.

5. The method of claim 1, further comprising:
   wherein upon a determination that said SMTP transaction does not include said resolved SMTP server IP address, releasing said SMTP transaction.

6. The method of claim 5, further comprising:
   prior to said releasing said SMTP transaction, determining whether said SMTP transaction includes at least one malicious code factor;
   wherein upon a determination that said SMTP transaction includes said at least one malicious code factor, taking protective action; and
   wherein upon a determination that said SMTP transaction does not include said at least one malicious code factor, releasing said SMTP transaction.

7. The method of claim 1, wherein said determining whether a DNS MX record query threshold is exceeded comprises:
   determining a DNS database rate; and
   comparing said DNS database rate to a DNS MX record query threshold,
   wherein if said DNS database rate is greater than said DNS MX record query threshold, said DNS MX record query threshold is exceeded.

8. The method of claim 7, wherein said determining a DNS database rate comprises:
   receiving parameters from a DNS proxy established on said host computer system, said parameters including parameters on selected DNS transactions detected by said DNS proxy and associated with said DNS MX record queries; and
   determining a total number of said DNS MX record queries detected by said DNS proxy over a specified time frame to generate said DNS database rate.

9. The method of claim 8, further comprising:
   entering at least a portion of said parameters in a DNS database.

10. The method of claim 1, further comprising:
    establishing said DNS proxy on said host computer system; and
    establishing a SMTP proxy on said host computer system.

11. The method of claim 10, wherein said SMTP transaction is stalled at said SMTP proxy.

12. A computer-program product comprising a computer readable storage medium containing computer program code comprising:
    a worm blocking application for:
       stalling a SMTP transaction from a client application on a host computer system;
       determining whether a DNS MX record query threshold of DNS MX record queries from client applications of said host computer system is exceeded; and
       wherein upon a determination that said DNS MX record query threshold is exceeded, said worm blocking application further for:
          determining whether said SMTP transaction includes a resolved SMTP server IP address returned to said host computer system from a DNS lookup of an IP address of a SMTP server name returned to said host computer system in response to said DNS MX record queries; and
          wherein upon a determination that said SMTP transaction includes said resolved SMTP server IP address, said worm blocking application further for taking protective action.

13. A computer system comprising:
    a memory having stored therein a worm blocking application; and
    a processor coupled to said memory, wherein execution of said worm blocking application generates a method comprising:
    stalling a SMTP transaction from a client application on a host computer system;
    determining whether a DNS MX record query threshold of DNS MX record queries from client applications of said host computer system is exceeded;
    upon a determination that said DNS MX record query threshold is exceeded, determining whether said SMTP transaction includes a resolved SMTP server IP address returned to said host computer system from a DNS lookup of an IP address of a SMTP server name returned to said host computer system in response to said DNS MX record queries;
    upon a determination that said SMTP transaction includes a resolved SMTP server IP address, taking protective action; and
    upon a determination that said SMTP transaction does not include a resolved SMTP server IP address, releasing said SMTP transaction.

* * * * *